United States Patent
Clark et al.

(10) Patent No.: US 12,168,241 B2
(45) Date of Patent: Dec. 17, 2024

(54) QUICK RELEASE SPRAY HEAD ASSEMBLY, ADAPTER, AND METHOD OF USE

(71) Applicant: BUNN-O-MATIC CORPORATION, Springfield, IL (US)

(72) Inventors: Charles H. Clark, Springfield, IL (US); Jason M. Banning, Springfield, IL (US); Jane Boehler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 512 days.

(21) Appl. No.: 17/127,192

(22) Filed: Dec. 18, 2020

(65) Prior Publication Data
US 2021/0237111 A1    Aug. 5, 2021

Related U.S. Application Data

(60) Provisional application No. 63/002,171, filed on Mar. 30, 2020, provisional application No. 62/970,559, filed on Feb. 5, 2020.

(51) Int. Cl.
*B05B 15/65*    (2018.01)

(52) U.S. Cl.
CPC .................. *B05B 15/65* (2018.02)

(58) Field of Classification Search
CPC ... B05B 15/65; B05B 1/14; B05B 1/18; A47J 31/4478; A47J 31/3685
USPC ...... 239/390, 397, 600; 285/148.23; 99/300, 99/315
See application file for complete search history.

(56) References Cited

U.S. PATENT DOCUMENTS

| | | | | |
|---|---|---|---|---|
| 6,755,119 | B1* | 6/2004 | Lyall | A47J 31/4478 99/315 |
| 7,669,519 | B2* | 3/2010 | Pope | A47J 31/4478 99/315 |
| 7,828,226 | B2* | 11/2010 | Martin | B05B 15/55 239/525 |
| 8,985,484 | B2* | 3/2015 | Eley | B05B 15/652 239/600 |
| 9,084,511 | B2* | 7/2015 | Clark | A47J 31/4478 |
| 10,307,012 | B2* | 6/2019 | Hart | A47J 31/4478 |
| 2003/0193193 | A1* | 10/2003 | Harrington | F16L 37/252 285/148.23 |

* cited by examiner

*Primary Examiner* — Steven J Ganey
(74) *Attorney, Agent, or Firm* — Barnes & Thornburg LLP

(57) ABSTRACT

A spray head assembly for use with a beverage brewer includes a spray head and an adapter. The spray head includes a back plate having a turn mechanism. The adapter includes a body having an outer portion and a threaded inner portion. The body has an opening through the threaded inner portion that is attachable to a valve of the beverage maker. The outer portion of the body includes ears attachable to the backer plate of the spray head through the turn mechanism.

12 Claims, 10 Drawing Sheets

QUICK RELEASE SPRAY HEAD ASSEMBLY, ADAPTER, AND METHOD OF USE

CROSS-REFERENCE TO RELATED APPLICATIONS

This application claims priority to U.S. Provisional Patent Application Ser. No. 62/970,559, filed Feb. 5, 2020, and to U.S. Provisional Patent Application Ser. No. 63/002,171, filed Mar. 30, 2020. The disclosures set forth in the applications referenced above are incorporated herein by reference in their entities.

BACKGROUND

The present disclosure generally relates to a beverage brewing apparatus, and more specifically, to an adapter for attaching spray head assembly to a spray head valve of the beverage brewing apparatus.

Generally, spray heads are used in beverage making equipment to dispense and distribute water to a beverage making substance. These spray heads are attached to a water delivery line generally in an upper housing portion of the beverage maker. Such spray heads are generally enclosed structures with a mounting portion for attachment to and removal from the water delivery line. A portion of the spray head includes one or more holes through which water is dispensed. A variety of attachment devices can be used to attach a spray head to a brewer including, as examples, a threaded attachment, clipped attachment or magnetic attachment. These spray heads tend to be formed of two or more plastic pieces which are sealed to form a chamber for accumulating and distributing water through holes formed in the spray head. Plastic spray heads can be advantageous to obtain flow characteristics and resistance to buildup of undesired particles such as lime. Further, plastic spray heads are more easily moldable and less costly compared to spray heads formed of other materials.

However, an issue with using spray heads formed of primarily plastic material is damage that can occur on threaded portions of the spray head used to attach the spray head to an spray head valve of the beverage making equipment, such as a backer plate. More particularly, male threads on the valve are typically formed of a metal material. When engaged with the female threads of the backer plate, cross-threading can occur. If further engaged, then damage to the plastic thread can potentially occur in turn. This issue can worsen over time as a user routinely detaches, cleans, and reattaches the plastic spray head.

DETAILED DESCRIPTION

Figure 1:
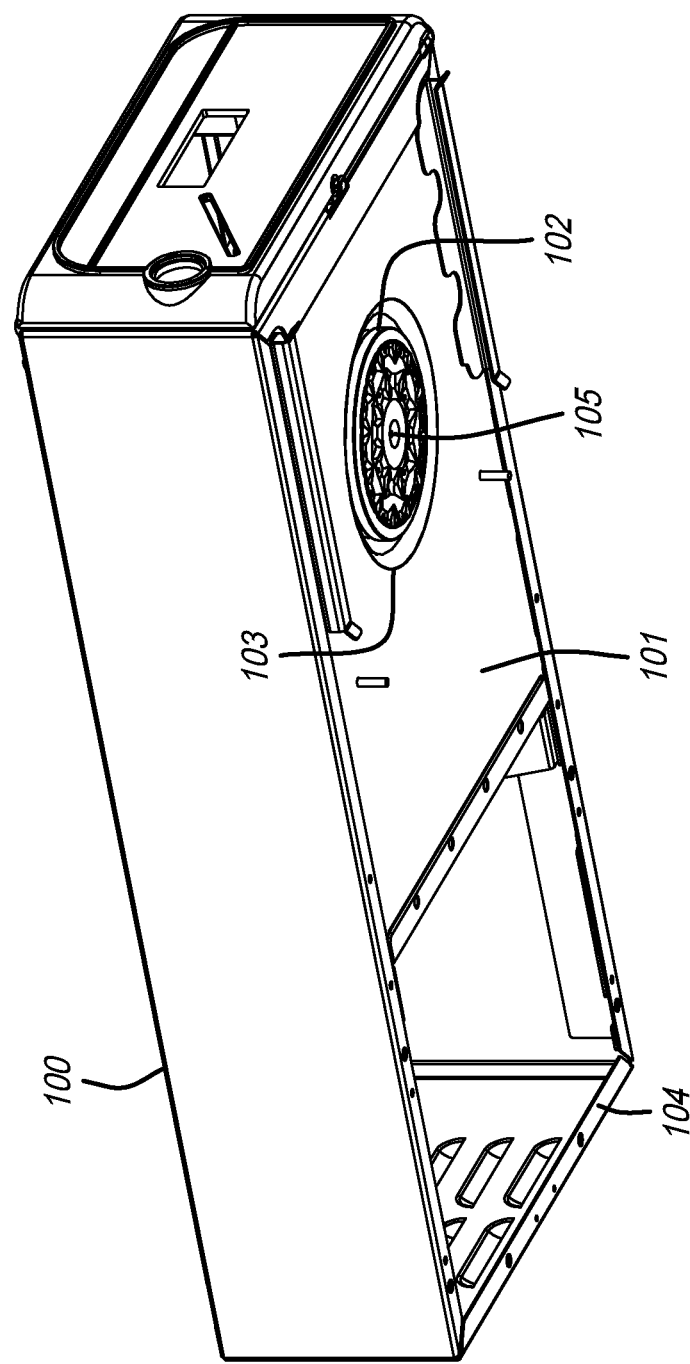
FIG. 1 is a perspective view of a hood of a beverage brewer having a removable spray head assembly.

While the present disclosure may be susceptible to embodiments in different forms, there is shown in the drawings, and described herein in detail, embodiments with the understanding that the present description exemplifies principles of the disclosure and does not intend to exhaust or limit the disclosure to the details of construction and the arrangements of components set forth in the following description and illustrated in the drawings. The present disclosure is described in connection with one or more contemplated embodiments which are not intended to be limiting of the scope of the present disclosure. The present disclosure is intended to encompass those embodiments as well as equivalents and variations.

Terms including beverage, brewed, brewing, and brewed beverage, as may be used herein, are intended to be broadly defined as including, but not limited to the brewing or making of tea, coffee, and any other beverages or food substances that will benefit from the present disclosure. This broad interpretation is also intended to include, but be limited to, any process of dispensing, infusing, steeping, reconstituting, diluting, dissolving, saturating, or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze-dried or other forms of materials including liquid, gel, crystal, or other form of beverage or food materials to obtain a desired beverage or food product. This broad interpretation is further intended to include, without limitation, at least funnel and filter-type, packet or pouch-type, pod-type, or other pre-packaged or unpackaged forms of retaining and brewing a beverage or making of a food product. The terms heated water may be interpreted as hot water, and generally refers to adding energy to water to heat the water above ambient temperature.

Referring now to FIG. 1, a hood 100 of a beverage brewer is shown. The beverage brewer is used to make a heated beverage, such as coffee, tea, or soup. The hood 100 may be attached to a body (not shown) of the beverage brewer at a base 101. Such a brewer is of known construction and typically include a hot water reservoir which controllably dispenses hot water through a water supply dispensing tube connected to a spray head and distributed onto a beverage making substance retained in a substance holder or funnel. When used to make a heated beverage, a heater of a liquid reservoir of the brewer may controllably heat the liquid (water) to a desired temperature. For making coffee and tea, the water in the liquid reservoir may be heated at a temperature approaching boiling, e.g., about 190-205 degrees Fahrenheit. Such a heating element may be coupled with and controlled by a controller. Further, an inlet tube may be coupled to and communicate with the liquid reservoir for dispensing liquid into the liquid reservoir. The controller is operable to permit liquid to flow out of the reservoir via an outlet tube. A controllable outlet valve is associated with the outlet tube and controllably operated by the controller. When the outlet valve is open, liquid can pass out of the outlet tube through a tube opening 105 to a spray head 102 (also referred to herein as a "spray head assembly") located within a sump area 103 of the base 101 to be distributed over beverage making material positioned in a brew funnel to allow the liquid to contact the beverage making material to make a desired beverage. The brewed beverage is then passed into a container such as a coffee carafe for distribution and consumption.

Over time with use, the spray head 102 may require cleaning. That can be due to residual liquid draining into portions of the spray head and evaporate, leaving residue, such as lime, particles, and other minerals. In cleaning the spray head 102, a user may detach the spray head 102 from the brewer, clean the spray head 102, and reattach the spray head 102. In some embodiments, the spray head 102 may be formed of thermoplastic, which tends to reduce the amount of mineral accumulation and make the need for cleaning to be relatively less frequent compared to spray heads formed of other materials. Further, the use of thermoplastic also allows for easier disassembly and reassembly of the spray head. One concern with detaching and reattaching a plastic spray head with a brewer involves damage to plastic threads of the spray head by threading the spray head onto a metal thread of the valve during reattachment. In doing so, cross-threading may occur and damage the plastic threads if further engaged.

Figure 2:
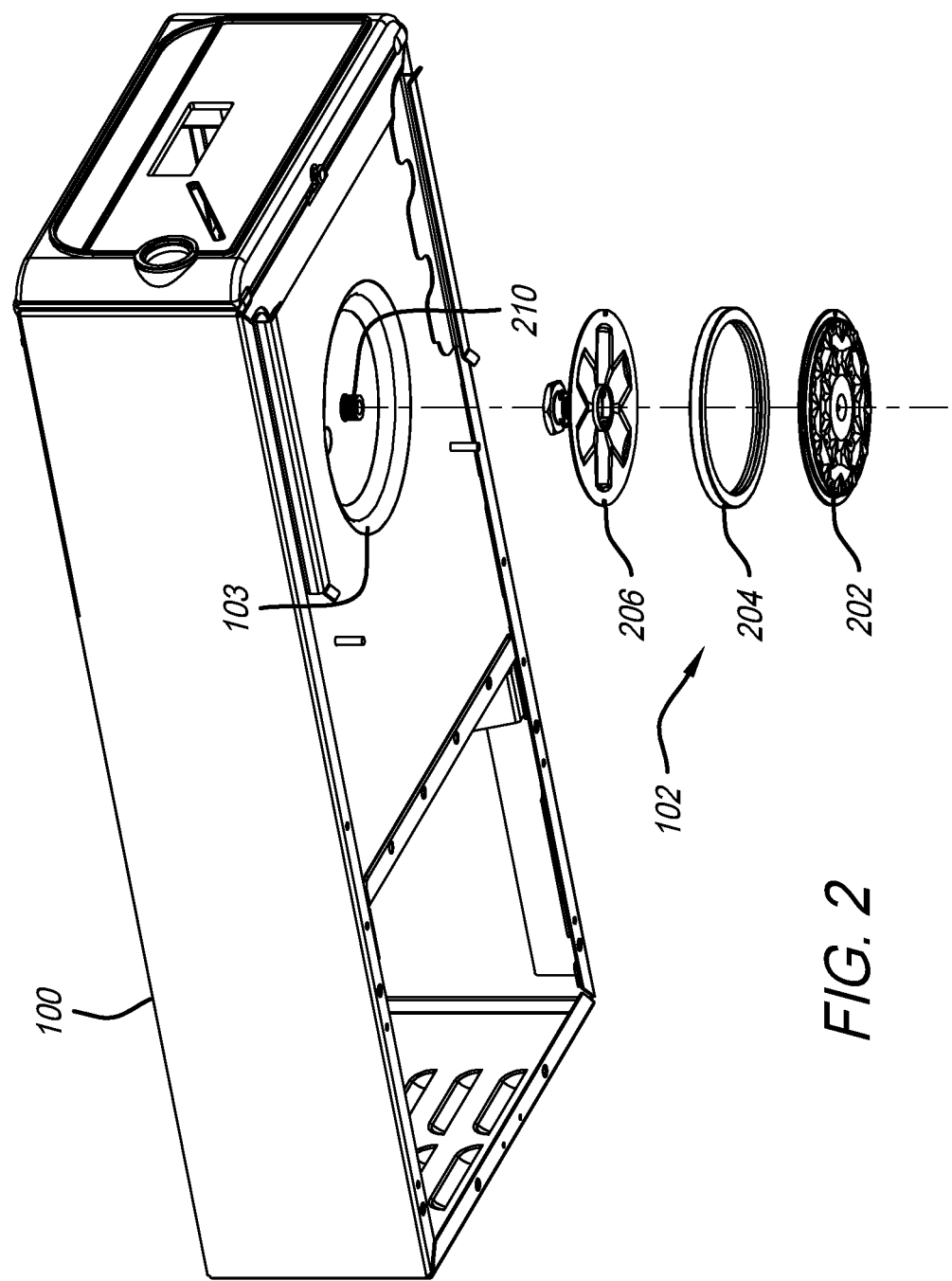
FIG. 2 is an exploded view of a spray head assembly.

Embodiments presented herein disclose a quick release adapter that can be threaded on the valve through an opening on the adapter. The spray head 102 is removably attachable to the adapter via a number of ears or tabs on the adapter that engage with the spray head 102, eliminating the need for threading the spray head 102 to the valve. FIG. 2 depicts an exploded view of the hood 100, exposing the components of the spray head assembly 102. Illustratively, the spray head assembly 102 includes a bottom portion 202, a retainer 204, and a top portion (also referred to herein as a "backer plate") 206. In use, the bottom portion 202 and the top portion 206 are engaged using the retainer 204, which provides a retaining means for the top portion 206 and the bottom portion 202. Further, the spray head assembly includes an adapter 208. In an embodiment, the adapter 208 may be formed of a metallic material, such as brass or nickel. Further, the outlet tube includes a threaded portion 210 having threads on the surface of the outlet tube for receiving the adapter 208.

Figure 4:
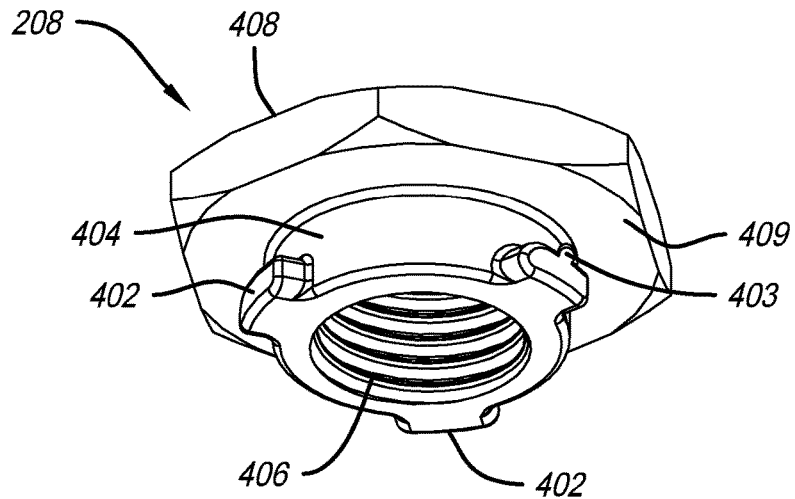
FIGS. 4-6 are various views of an embodiment of a spray head adapter of a spray head assembly.
Figure 5:
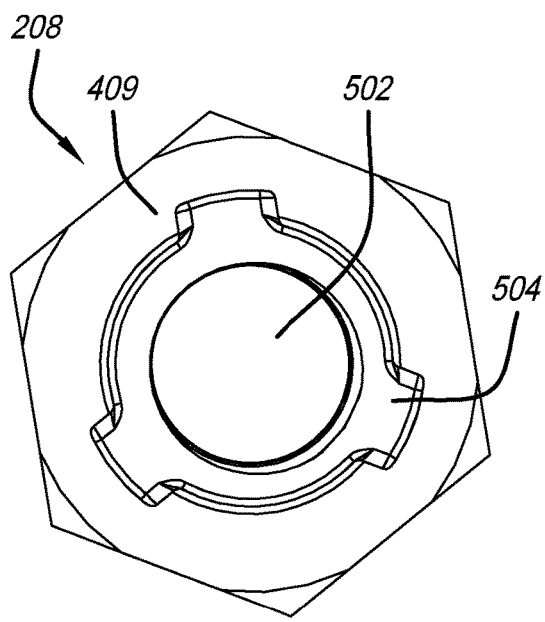
Figure 6:
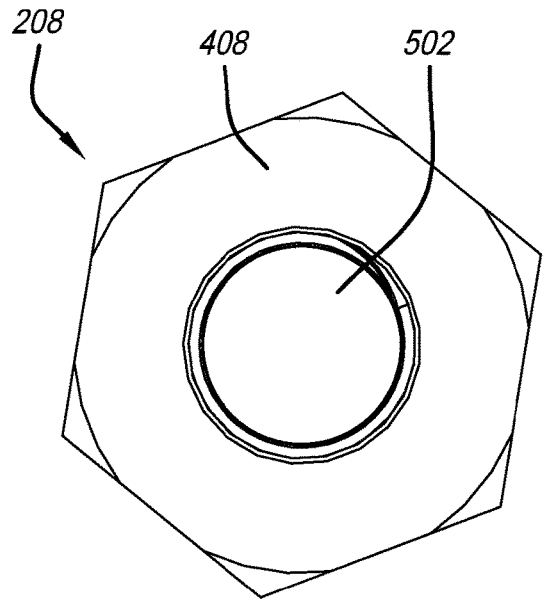

Referring to FIGS. 4-6, several views of the adapter 208 are shown. FIG. 4 depicts a perspective view of the adapter 208. FIG. 5 depicts a view of the bottom of the adapter 208. FIG. 6 depicts an overhead view of the adapter 502. As shown, the adapter 208 includes a body 404, a top portion 408, a top surface portion 409, and a bottom portion 504. The top portion 408 may be embodied as a hex piece used for sealing the backer plate 206 at the top surface portion 409. Generally, to seal the backer plate 206 with the top surface portion 409, the hex piece should be large enough to cover the opening in the backer plate 206. The body 404 is generally cylindrical in shape having an outer portion and an inner threaded portion 406. The body 404 also includes cars 402. In addition, body 404 can optionally include an car 403 protruding from the outer portion of the body 404, in which the car 403 includes a ribbed portion that is not present in the cars 402. However, in some embodiments (and as further described herein), each of the cars of the spray head adapter may include the ribbed portion. Further, the body 404 has a spatial opening 502 having the inner threaded portion 406 that engage with an outer threaded portion 210 of the outlet tube.

Figure 3:
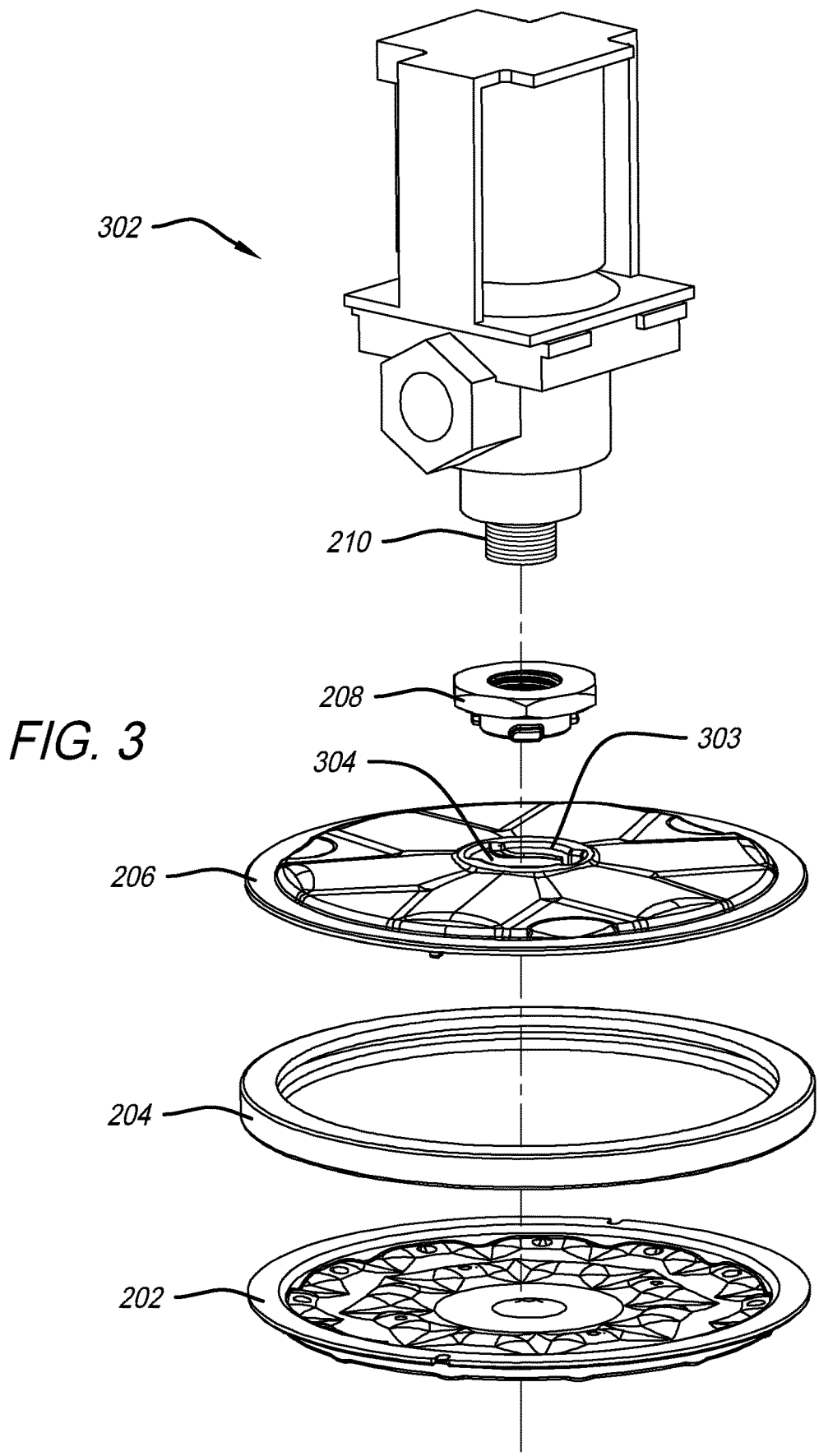
FIG. 3 is another exploded view of a spray head assembly shown relative to a valve of a beverage brewer.
Figure 8:
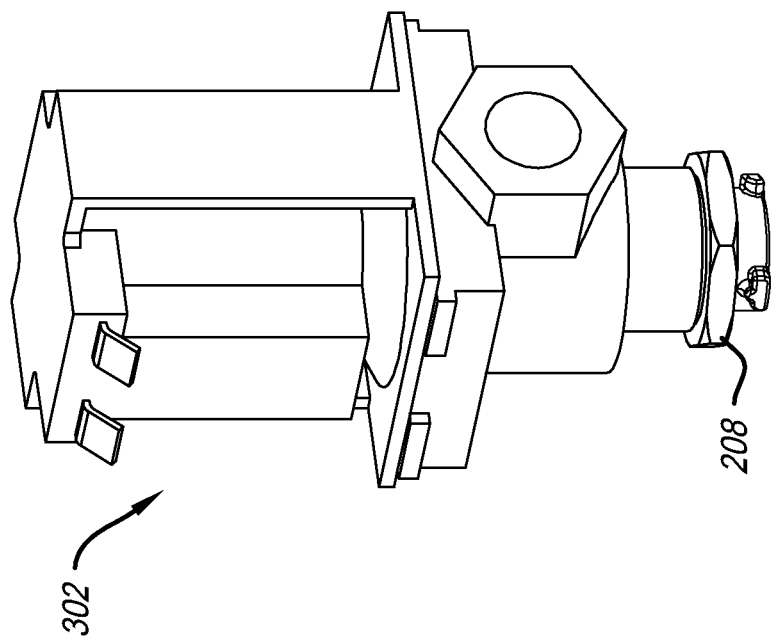
FIGS. 7 and 8 are conceptual diagrams of a fitting used as a spray head adapter to a threaded portion of a valve.
Figure 7:
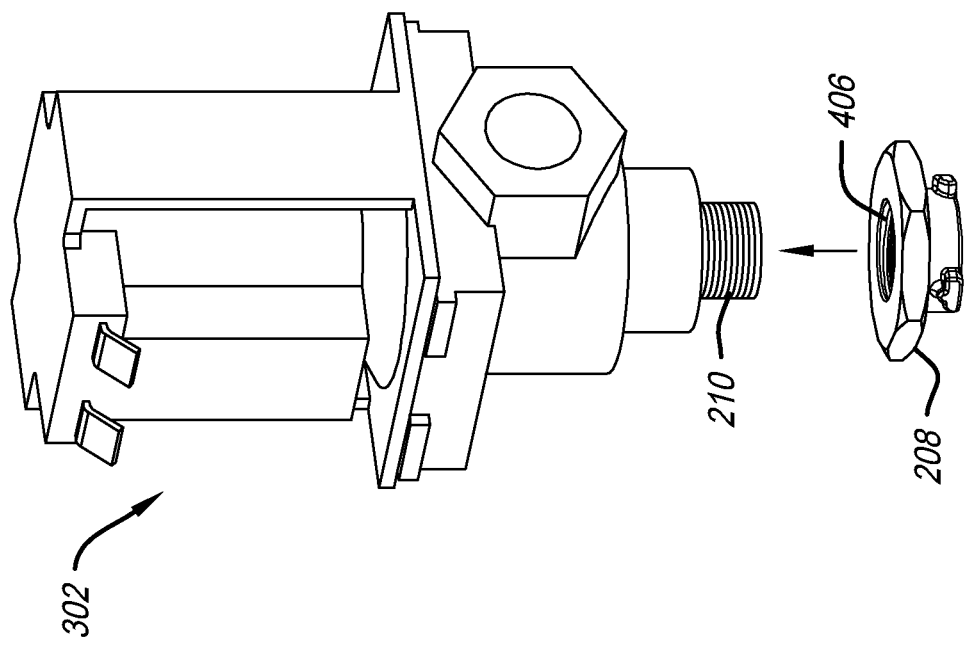

Referring now to FIG. 3, another exploded view of the spray head assembly 102 is shown relative to a valve 302 of the beverage brewer. The valve 302 includes the threaded portion 210 of the outlet tube. As shown in FIG. 3 and more particularly in FIGS. 7 and 8, the outer threaded portion 210 may engage with the inner threaded portion 406 to attach the valve 302 and adapter 208 with one another. Because the inner threaded portion 406 may be formed of a metallic material, engaging with the outer threaded portion 210 is less likely to result in cross-threading and subsequent damage to either threaded portion 210 or 406. Generally, in practice, the adapter 208 is not to be removed from the valve 302 during service. To this effect, in some embodiments, the adapter 208 may be further affixed to the valve 302 using an adhesive substance, such as a glue, for a more permanent fixture of the adapter 208 to the valve 302.

Figure 17:
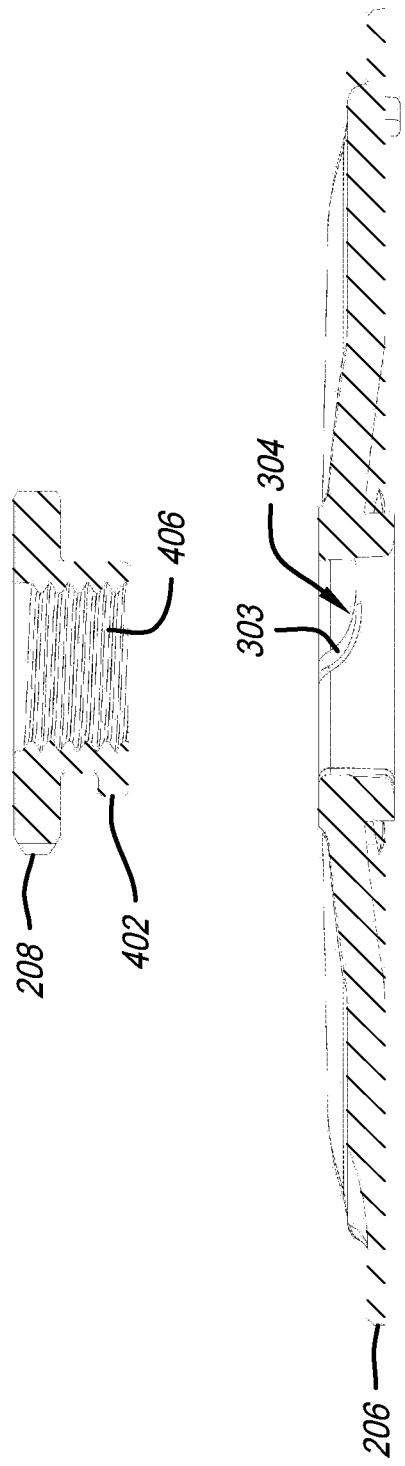
FIG. 17 are cross-sectional views of an embodiment of the spray head adapter and the backer plate.

The adapter 208 is removably attachable to the backer plate 206. More particularly, the backer plate 206 includes a turn mechanism 303 (e.g., a "⅓ turn" mechanism) along the edges of a center opening 304 thereof used to engage with the ears 402 (and 403, if present) of the adapter 208. FIG. 17, which depicts a cross-section of the backer plate 206 and the adapter 208, further illustrates the turn mechanism 303. To attach, a user may fit the body 404 over the center opening 304 and turn the backer plate 206 until the cars 402 stop. The ears 402 engage the illustrated stop in the backer plate. In an embodiment, the turn mechanism 303 includes a sloped ridge and radii to guide a user in locating and fitting the optional ear 403 to the backer plate 206. Advantageously, this arrangement allows the user to more easily locate the ear 403 (if present) to the backer plate 206 in a "blind" assembly. In an embodiment, the backer plate 206 may include a rubber grip to allow the adapter 208 to be better seated relative to the backer plate 206 when engaged. The rubber grip may also allow a user to install the adapter 208 without needing any additional tools. As stated, generally in practice the adapter 208 is not to be removed once installed.

Figure 10:
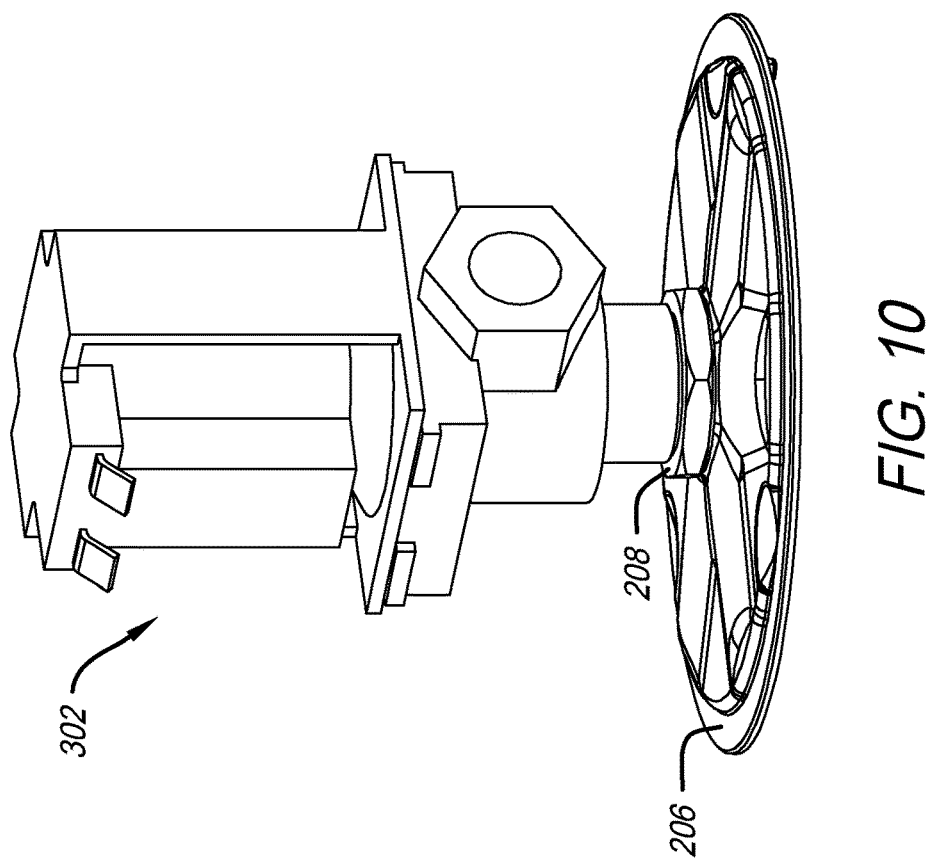
FIGS. 9 and 10 are conceptual diagrams of a fitting of a backer plate of a spray head assembly to a valve via a spray head adapter.
Figure 9:
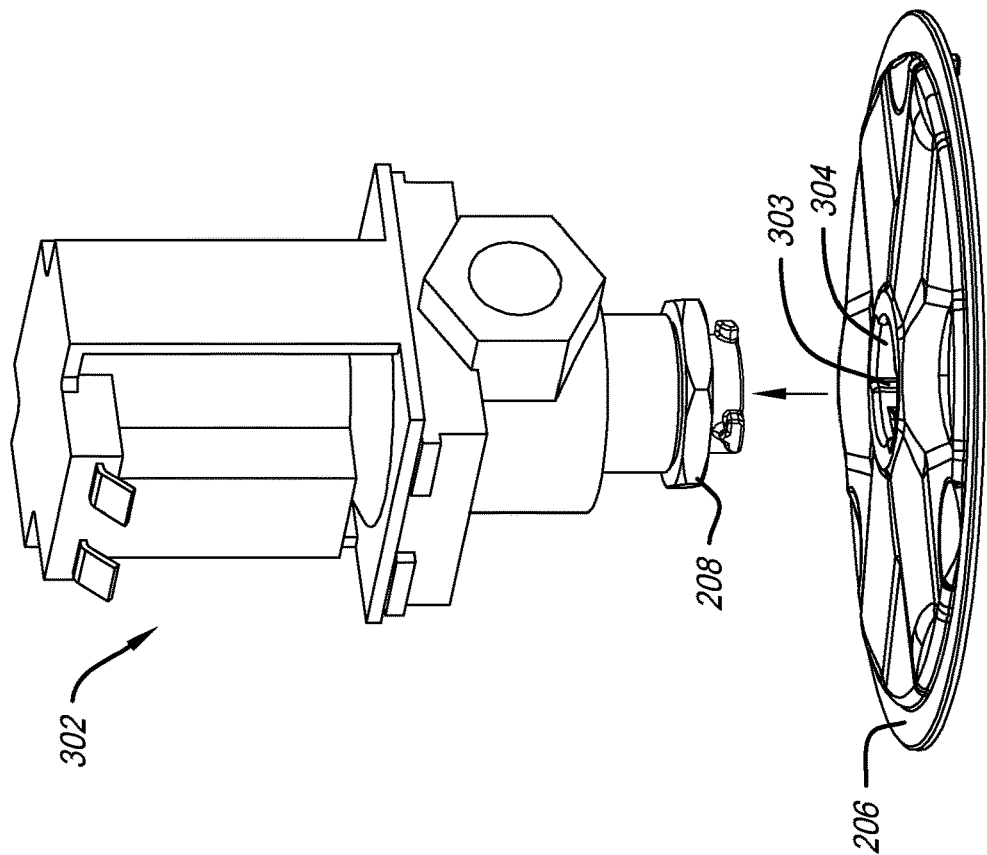

FIGS. 9 and 10 depict the attachment of the backer plate 206 to the adapter 208 that is connected with the valve 302. In this arrangement, a user that wishes to clean the spray head 102 does so by turning the backer plate 206 in a manner such that the backer plate 206 disengages with the adapter 208. Advantageously, this approach eliminates the potential of the threaded portion 210 of the valve 302 to misalign and damage the plastic spray head 102 by relocating the threading action to occur between the valve 302 and the adapter 208. In addition, as shown in FIG. 10 and other figures, the adapter 208 is of a greater radius than the unthreaded portion of the tube of the valve 302. Doing so provides a sealing between the spray head 102 and the valve 302 for pulse and to prevent air being drawn into the water flow of the spray head 102.

Figure 11:
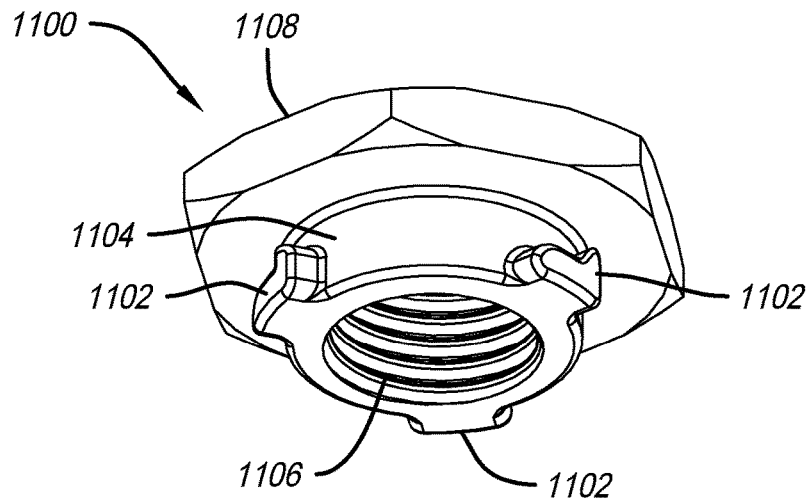
FIGS. 11-13 are various views of another embodiment of a spray head adapter of a spray head assembly.
Figure 12:
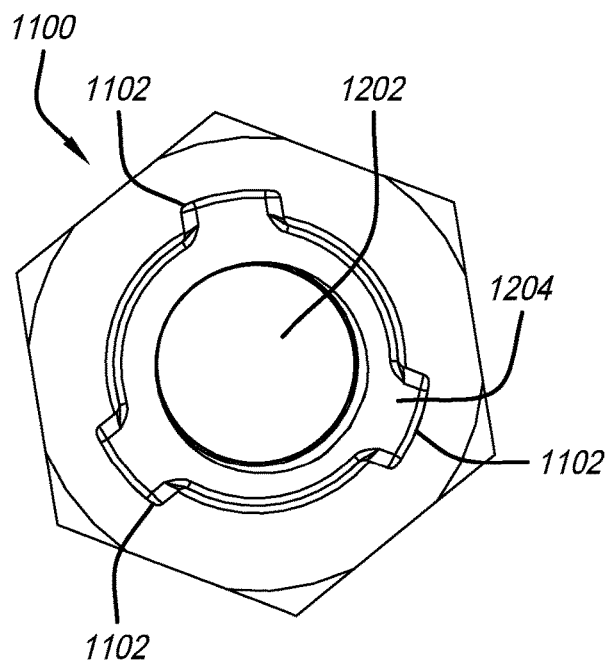
Figure 13:
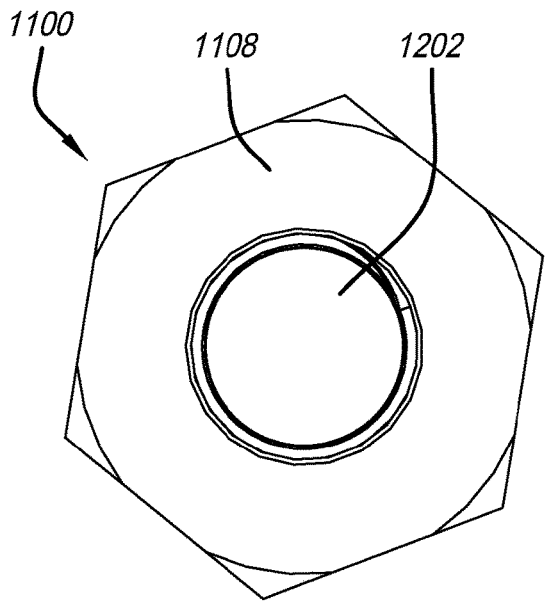

FIGS. 11-13 are various views of another embodiment of an adapter used to connect the valve 302 with the spray head assembly 102. More particularly, FIGS. 11-13 are views of an adapter 1100. FIG. 11 depicts a perspective view of the adapter 1100. FIG. 12 depicts a view of the bottom of the adapter 1100. FIG. 13 depicts an overhead view of the adapter 1100. As shown, the adapter 1100 includes a top portion 1108, a body 1104, and bottom portion 1204. The body 1104 is generally cylindrical in shape and includes ears 1102 protruding therefrom. Further, the body 1104 has a spatial opening 1202 having an inner threaded portion 1106 that can engage with the outer threaded portion 210 of the outlet tube.

Figure 15:
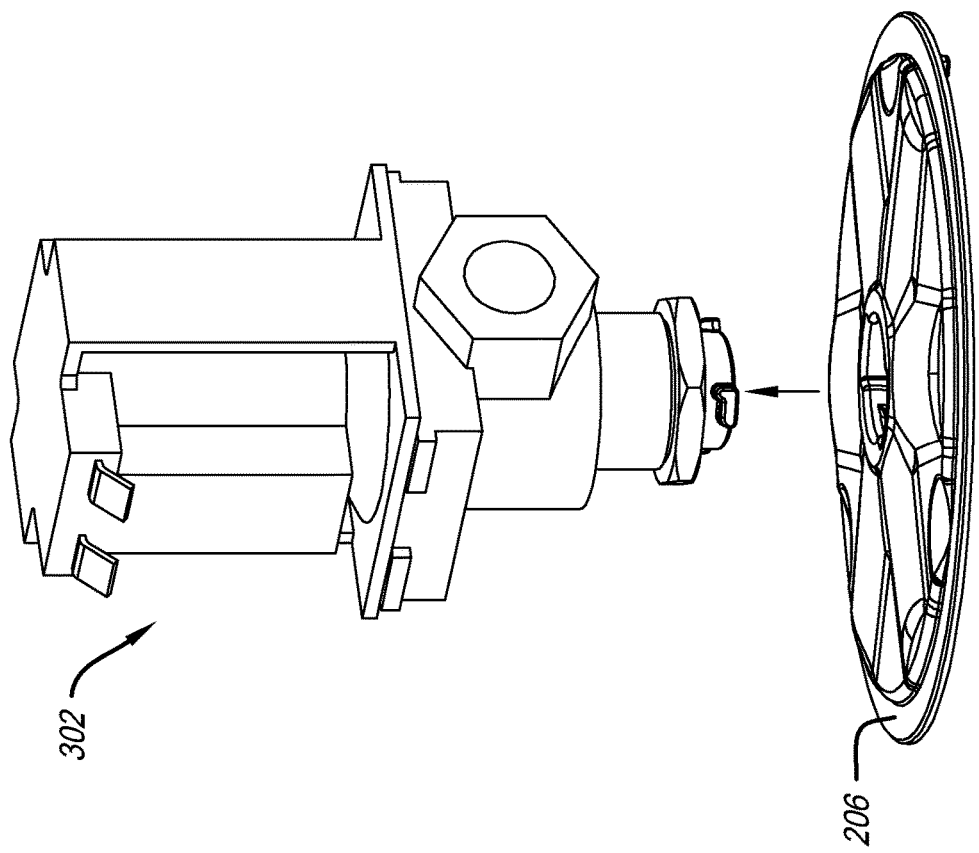
FIGS. 14-16 are conceptual diagrams of a fitting of a valve to a spray head assembly via a spray head adapter.
Figure 14:
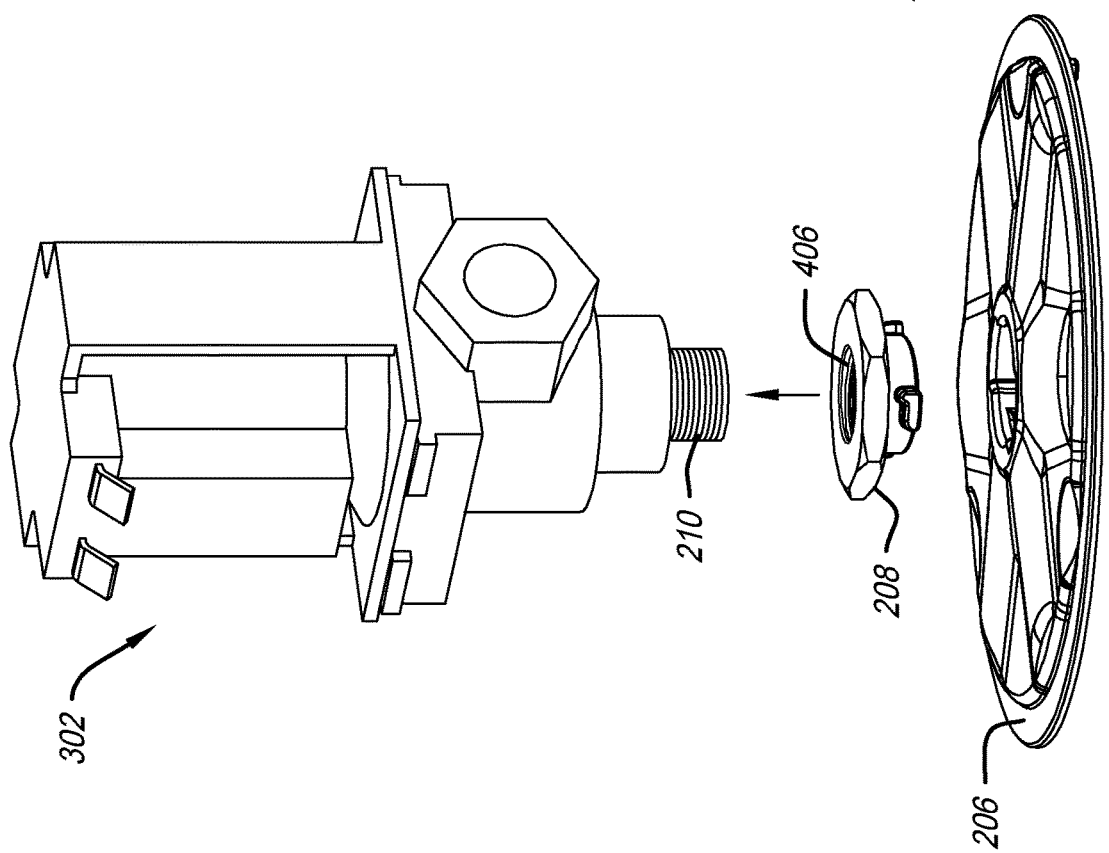
Figure 16:
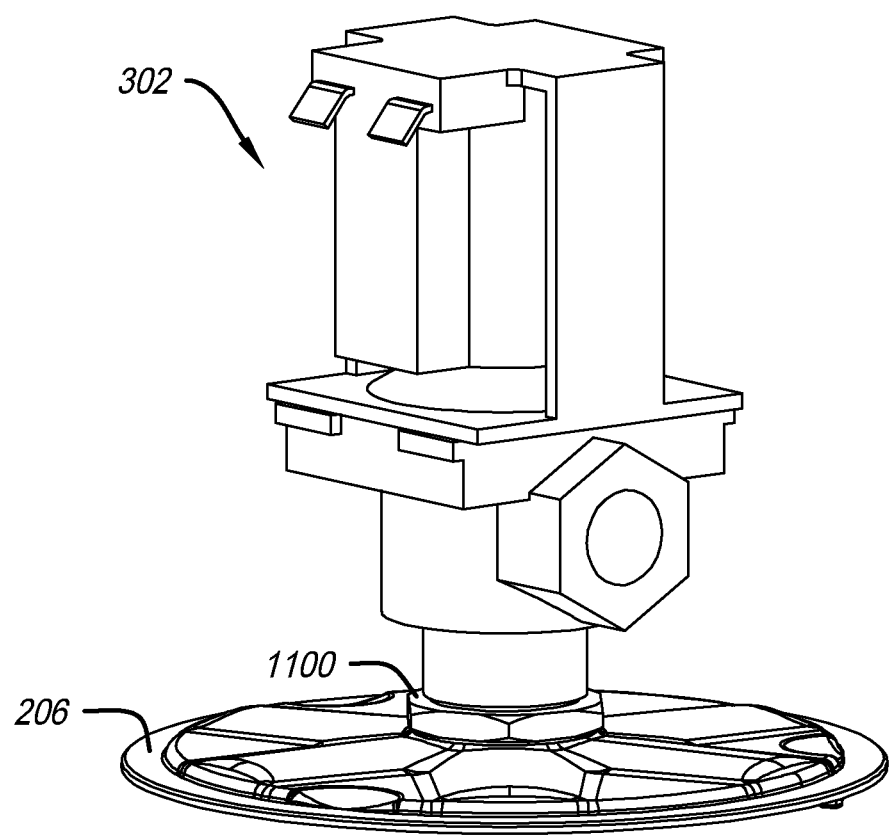

In contrast to the ears of spray head adapter 208, all of the ears 1102 on the body 1104 can include a ribbed portion for interlocking with the backer plate 206. Including ribbed portions on each ear 1102 on the body 1104 may further secure the adapter 1100 to the backer plate 206 when engaged. Of course, additional embodiments may omit the ribbed features of the ear 1102 and engage with the backer plate 206 using other means. FIGS. 14-16 are conceptual diagrams of a fitting of the valve 302 to the spray head assembly 102 via the spray head adapter 1100. The threaded portion 210 of the valve 302 may engage with the threaded portion 1106 to secure the adapter with the valve 302, as shown in FIGS. 14 and 15. To attach the spray head 102 to the brewer, the user may fit the body 1104 through the center opening 304 and turn the backer plate until the ribbed ears 1102 lock into place. FIGS. 15 and 16 depict the attachment of the backer plate 206 to the adapter 1100. In this arrangement, a user that wishes to clean the spray head 102 does so by turning the backer plate 206 in a manner such that the backer plate 206 disengages with the adapter 1100.

The invention claimed is:

1. A spray head assembly for use with a beverage making apparatus comprising:
   a spray head comprising a backer plate including a turn mechanism having a sloped ridge;
   an adapter having a body having an outer portion and a threaded inner portion, the body having an opening through the threaded inner portion attachable to a valve of the beverage making apparatus, and the outer portion of the body including a plurality of ears attachable to the backer plate of the spray head via the turn mechanism.

2. The spray head assembly of claim 1, wherein the spray head is formed of a plastic material.

3. The spray head assembly of claim 2, wherein the adapter is formed of a metal material.

4. The spray head assembly of claim 1, wherein at least one of the plurality of ears includes a rib and wherein the backer plate includes a center opening receivable for the plurality of ears.

5. The spray head assembly of claim 4, wherein the plurality of ears is lockable on the center opening of the backer plate through the rib of the at least one of the plurality of ears.

6. The spray head assembly of claim 1, further comprising adhesive substance adapted to adhering the adapter to the valve.

7. An adapter for connecting a spray head to a valve, the adapter comprising:
   a body having an outer portion and a threaded inner portion, the body further having an opening through the threaded inner portion attachable to the valve, and the outer portion of the body including a plurality of ears attachable to the spray head, the plurality of ears being attachable to the spray head via a turn mechanism of a backer plate of the spray head, the turn mechanism having a sloped ridge.

8. The adapter of claim 7, wherein at least one of the plurality of ears includes a rib and wherein the plurality of ears are attachable to a center opening of the backer plate receivable for the plurality of ears.

9. The adapter of claim 8, wherein the plurality of ears is lockable on the center opening of the backer plate through the rib of the at least one of the plurality of ears.

10. The adapter of claim 7, wherein the adapter further comprises an adhesive substance adapted to adhere the adapter to the valve.

11. The adapter of claim 7, wherein the adapter is formed of a metal material.

12. An adapter for connecting a spray head to a valve, the adapter comprising:
   a body having an outer portion and a threaded inner portion, the body further having an opening through the threaded inner portion attachable to the valve, and the outer portion of the body including a plurality of ears attachable to a turn mechanism of a backer plate of the spray head, the turn mechanism having a sloped ridge; and
   an adhesive substance adapted to adhere the adapter to the valve.

* * * * *